J. W. PLACE.
PRESSURE GAGE.
APPLICATION FILED MAR. 8, 1919.
1,315,327. Patented Sept. 9, 1919.
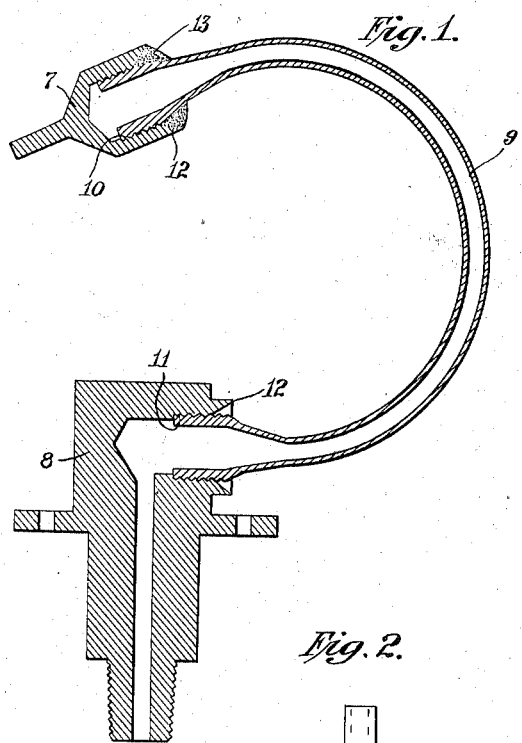
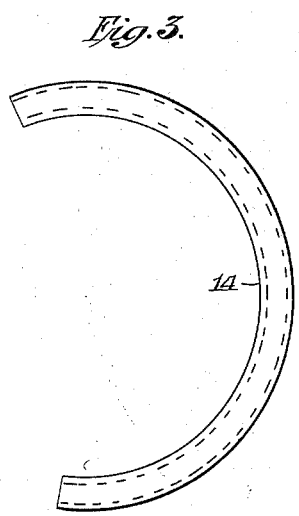
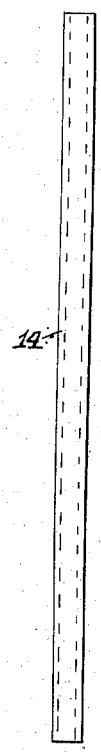
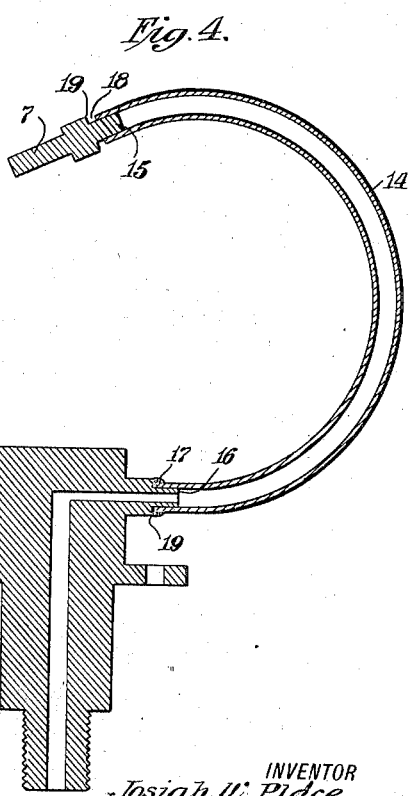
INVENTOR
Josiah W. Place
BY
ATTORNEYS

UNITED STATES PATENT OFFICE.

JOSIAH W. PLACE, OF BROOKLYN, NEW YORK, ASSIGNOR TO UNITED STATES GAUGE COMPANY, OF NEW YORK, N. Y., A CORPORATION OF NEW YORK.

PRESSURE-GAGE.

1,315,327.   Specification of Letters Patent.   Patented Sept. 9, 1919.

Application filed March 8, 1919. Serial No. 281,356.

*To all whom it may concern:*

Be it known that I, JOSIAH W. PLACE, a citizen of the United States of America, residing at Brooklyn, New York, have invented a new and useful Pressure-Gage, of which the following is a specification.

My present invention has reference to gages of the Bourdon tube type.

As is well known in the art, certain difficulties have been experienced heretofore in the use of Bourdon springs for high pressure gages and in the use of such tubes with certain materials, such for instance, as ammonia. To overcome some of these difficulties various expedients have been proposed. Thus, it has been proposed to form the complete tube, including the mounting or "socket" and the closed "end" in a single piece by boring a solid bar of steel to a point short of the end thereof so as to leave the end closed by solid metal.

This is a relatively slow and expensive process and while satisfactory for certain purposes, tubes of this character are too expensive for general purposes and are liable to develop flaws occasioned by the boring and "shaping up" steps.

The objects of my invention are to provide a Bourdon tube which will have all the advantages of the integrally formed tube but which can be produced at a relatively low cost and which will be practical for general use.

In the accomplishment of my invention I employ for the tube proper a suitable steel tubing and I secure this tube at one end to a socket by an integral weld and close the free end of the tube by an end piece integrally welded thereto. In welding the opposite ends of the relatively light steel tube to the socket and end piece, which usually are of greater mass than the tube itself, I have found it expedient to reduce the mass of the socket and the end piece at the juncture of the tube therewith to substantially the mass of the tube. This enables the heating of the parts to be joined to substantially the same welding temperature, without "burning" or injuring the tube, and further provides for the localizing of the heat at such joints. The steel tube is tempered to act as a spring and one of the features of my invention consists in tempering or heat treating the tube after the welding steps have been accomplished.

In the accompanying drawing, I have illustrated practical embodiments of my invention wherein:

Figure 1 is a sectional view of a complete Bourdon tube, having the end piece welded in place and the socket and tube elements prepared and ready for the welding step.

Figs. 2 and 3 are detail views illustrating first a length of commercial tubing of flattened or oval cross section, and second, said tube as bent to form a Bourdon spring.

Fig. 4 is a sectional view similar to Fig. 1 illustrating the welding of said tube to the end piece and socket element provided therefor.

In the first form illustrated both the end piece 7 and the socket, base or mounting 8 are socketed to receive the ends of the tube element 9. This tube element is in the form of a flattened piece of steel tubing shown as having threaded end portions 10 and 11 screwed into the threaded sockets provided in the end piece and socket member respectively.

The socket and end piece are, as illustrated, usually heavier or of greater mass than the tube element which is relatively light and thin to provide for the spring movement thereof. To enable the welding of these parts of greater mass to the relatively lighter tube, I reduce the mass of the heavier elements, at the juncture of the tube therewith, to substantially the mass of said tube. This is accomplished in the first form by beveling the mouth or edge of the socket in the end piece and in the support to form a relatively narrow rim 12 surrounding the end portion of the tube. This also provides an annular cup or "gutter" about the tube. The weld is made between this reduced rim portion of the end piece and socket and the body of the tube, one of such welds being indicated at 13 in Fig. 1. The metal for the weld is supplied from a wire or the like, and the necessary heat may be provided by an oxy-acetylene flame, by electric current or otherwise. In any event, the reduced portion of the end piece or socket and the adjoining portion of the tube are both brought to substantially the same welding heat and usually enough welding metal is supplied to fill the gutter between the two parts and provide an integral lock between such parts. The end piece and socket and the welding material are usually of suitable ferrous metal.

My invention contemplates the utilization of ordinary commercial flat or oval steel tubing, a section of which is illustrated at 14 in Fig. 2. This section of commercial tubing is shown in Fig. 3 bent into the shape of a Bourdon spring, and in Fig. 4 the same is shown being joined to the end piece and socket. In the construction under consideration the joints are effected by slipping the ends of the tube over the nipples or extensions 15 and 16 provided on the end piece and socket. These nipples, it will be noted, are reduced to substantially the mass of the relatively thin tubing, and hence, enable the production of a perfect weld between the different parts, one of the welds being indicated at 17. Usually, a space or "gutter" 18 is left between the end of the tube and the adjacent shoulder 19 on the end piece and socket to receive the welding metal. This shoulder also provides a point of reduced mass which enables the proper heating of the parts at the juncture to secure a perfect weld.

The localization of the welding heat in the manner described prevents injury to the tube element, and in some cases it is possible to complete the welding operations without injuriously drawing the temper of the tube. The invention contemplates, however, the final step of tempering the tube after completion of the welds. This enables the use of all the heat necessary to secure the proper integral joinder of the parts, and after such joinder is effected the tube, otherwise complete, may be tempered or heat treated to give it the proper permanent spring tension.

The invention provides a Bourdon tube which has all the desirable qualities of a one-piece structure and at the same time this tube can be produced at relatively low cost. The tube is well suited for use in high pressure gages and is particularly suitable for gages used with ammonia and the like.

I claim:

1. In a Bourdon tube for ammonia, high pressure gages and the like, a relatively heavy supporting base of ferrous metal, a relatively light tube of spring steel having one end engaged with said supporting base and integrally welded thereto, said supporting base having a portion at the juncture of the tube therewith reduced to substantially the same cross sectional area as the steel tube to enable the unitary weld of the one part to the other part.

2. In combination with the elements set forth in claim 1, an end piece of ferrous metal engaged with the free end of the tube and having a portion at the juncture of the tube therewith reduced to substantially the same cross sectional area of the tube, and a weld integrally joining such reduced portion to the end portion of the tube.

3. In a Bourdon tube for ammonia, high pressure and the like gages, a supporting base of ferrous metal, a spring steel tube engaged with said supporting base, an end piece of ferrous metal engaged with the free end of the tube, the tube being welded integrally at its opposite ends to the ferrous base and end piece respectively.

4. In a Bourdon tube for ammonia, high pressure and the like gages, a tube of relatively light spring steel, a ferrous member of greater mass than the tube engaged with one end of the tube and having a portion at the juncture of the tube therewith reduced to substantially the same cross sectional area as the tube and integrally welded to the adjoining portion of the tube.

JOSIAH W. PLACE.